US008645845B2

(12) United States Patent
Tappen et al.

(10) Patent No.: US 8,645,845 B2
(45) Date of Patent: Feb. 4, 2014

(54) COLLABORATION PLANE (75) Inventors: Charles Tappen, Burbank, CA (US);
Andrew Selle, Burbank, CA (US); Brent Burley, Burbank, CA (US); Dan Candela, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 238 days.

(21) Appl. No.: 13/219,256

(22) Filed: Aug. 26, 2011

(65) Prior Publication Data

US 2013/0055107 A1 Feb. 28, 2013

(51) Int. Cl.
*G06F 3/00* (2006.01)

(52) U.S. Cl.
USPC ............................ 715/753; 715/740; 715/751

(58) Field of Classification Search
USPC ........................................ 715/753, 740, 751
See application file for complete search history.

(56) References Cited

U.S. PATENT DOCUMENTS

| | | | | |
|---|---|---|---|---|
| 6,606,744 | B1 * | 8/2003 | Mikurak | 717/174 |
| 8,265,942 | B2 * | 9/2012 | Doyle et al. | 705/1.1 |
| 2004/0019648 | A1 * | 1/2004 | Huynh et al. | 709/206 |
| 2009/0254971 | A1 * | 10/2009 | Herz et al. | 726/1 |
| 2011/0302258 | A1 * | 12/2011 | Huynh et al. | 709/206 |
| 2012/0046770 | A1 * | 2/2012 | Becker et al. | 700/94 |
| 2013/0063613 | A1 * | 3/2013 | Conwell | 348/207.99 |
| 2013/0212486 | A1 * | 8/2013 | Joshi et al. | 715/744 |

OTHER PUBLICATIONS

JavaHelp™ 2.0 System User's Guide, 2004, Sun Microsystems, Inc., 132 pages.
HelpScribble: How to Provide Help with Office Applications Written in Visual Basic for Applications; 1996, http://www.helpscribble.com/vba.html, 4 pages.
Wyatt, Allen; "Getting Context-Sensitive Help"; 2008, http://word.tips.net/T001178_Getting_Context-Sensitive_Help.html, 2 pages.

* cited by examiner

*Primary Examiner* — David Phantana Angkool
(74) *Attorney, Agent, or Firm* — Kilpatrick Townsend & Stockton LLP (57) ABSTRACT

Methods and systems for dynamically and collaboratively generating software documentation are described. In particular, methods and systems provide for in-context authoring, identification, and presentation of software documentation based on one or more determined contexts. For example, methods and systems enable a computing device to identify one or more current contexts for the device, and to provide documentation content based on the identified context.

20 Claims, 9 Drawing Sheets

COLLABORATION PLANE

BACKGROUND

The complexity of computer software applications has increased rapidly since the advent of the personal computer. For example, current office software applications, such as word processing, spreadsheet, and database programs include thousands of different features. Due to such complexity, users often turn to software documentation in order to learn how a specific software application operates, and how to resolve any software-related problems.

Software documentation, however, is typically static and written in a general and broad manner. Such documentation can quickly become out of date and lack depth. As a result, users are often unable to receive the information they need to solve their software-related issues. Because of such problems, users frequently generate supplemental documentation in an ad-hoc manner. Such documentation, however, is typically decoupled and out-of-context from the software application. As result, users can find it difficult to locate information relevant to their specific problems.

Accordingly, what is needed in the art is a software documentation system that enables users to locate up to date and relevant information to solve their software-related issues.

BRIEF SUMMARY

Methods and systems for dynamically and collaboratively generating software documentation are described. In particular, methods and systems provide for the authoring, identification, and presentation of software documentation based on one or more determined contexts. Illustratively, methods and systems enable a computing device to identify one or more current contexts for the computing device and to provide documentation or other content to a user based on the identified contexts.

In one implementation, a method for authoring content using a computing device includes presenting, by the computing device, a content authoring interface; receiving, by the computing device, an item of content via the content authoring interface; receiving, by the computing device, at least one context associated with the item of content; dynamically updating, by the computing device, a content repository based on the received item of content and the at least one received context associated with the item of content; determining, by the computing device, one or more current contexts for the computing device; selecting, by the computing device, one or more items of content from the content repository based at least in part on the determined one or more current contexts; and presenting, by the computing device, the selected one or more items of content.

In some variations, the determining includes determining one or more contexts associated with a user desktop of the computing device. The determining is based at least in part on one or more of user desktop window information, user desktop window focus information, user desktop cursor position information, or software application status information. The determining includes identifying a workgroup associated with the computing device. The determined one or more contexts are based on at least one of the following: one or more software applications being executed by the computing device; one or more software applications installed on the computing device; one or more software elements being executed by the computing device; one or more software application files being accessed by the computing device; one or more portions of a software application file being accessed by the computing device; input device information; one or more computing device identifiers; one or more user identifiers associated with a user of the computing device; or one or more user groups associated with a user of the computing device. The presenting includes displaying a graphical user interface, where the graphical user interface includes a semi-transparent layer. The presenting includes overlaying at least one of the selected items of content over a display element, where the display element is associated with a determined context. The display element is one of a dialog box, an icon, a software application button, or a software application window. The presenting includes rendering a visual element indicative of an association between at least one of the selected items of content and a display element, where the display element is associated with a determined context. The presenting includes grouping, based on the determined contexts, one or more of the selected items of content; and presenting the one or more selected items of content based on the grouping. Items of content associated with the same context are grouped together. The method can further include receiving a message from a first user; identifying a second user based on the determined contexts; and sending the received message to the second user. The sending includes transmitting the received messaged to another computing device, where the another computing device is associated with the second user. The sending includes transmitting the received message to an electronic message repository associated with the second user.

In another implementation, a computer-readable storage medium containing program instructions that, when executed by a computer system, can cause the computer system to execute a method for authoring documentation, the method including: determining, by the computer system, one or more current contexts for a computing device; presenting, by the computer system, software documentation selected based at least in part on the determined one or more current contexts; receiving, by the computer system, updates to the software documentation from a user; and dynamically updating, by the computer system, a content repository with the updates to the software documentation.

In certain variations, the determining includes determining one or more contexts associated with a user desktop of the computing device. Additionally, determining the one or more contexts is based on user desktop window information, user desktop window focus information, user desktop cursor position information, or software application status information.

In still another implementation, a system includes: an input device configured to receive inputs from a user; an output device configured to present information to a user; and a processor connected to the input device and the output device, where the processor is configured to: present a content authoring interface using the output device; receive an item of content using the input device; receive at least one context associated with the item of content using the input device; determine one or more current contexts for the system, where the determining includes receiving user desktop window information, user desktop window focus information, user desktop cursor position information, and software application status information associated with a user desktop; select one or more items of content based at least in part on the determined current contexts; and present the selected one or more items of content using the output device.

According to some variations, the determining includes identifying whether two or more specific software applications are currently being executed by or installed on the system and selecting at least one item of content associated with the two or more specific software applications if the two or more specific software applications are currently being executed by or installed on the system. The determining further includes identifying a workgroup.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details.

Methods and systems for dynamically and collaboratively generating software documentation are described. In particular, methods and systems provide for the authoring, identification, and presentation of software documentation based on one or more determined contexts. Illustratively, methods and systems enable a computing device to identify one or more current contexts for the computing device and to provide documentation or other content to a user based on the identified contexts.

In one specific embodiment, a user can, via a computing device, author documentation and define contexts in which the documentation is applicable. Illustratively, a user can interact with a computing device to author documentation for the "print function" of a word processing program. The user can additionally indicate that the documentation is relevant where a print setup dialog box associated with the word processing program is open. The user can further indicate that the documentation be shared with only a specific workgroup or department group.

During operation, the computing device (or another computing device) can monitor for requests for software documentation. In response to a request, the computing device can determine one or more contexts for the computing device. Based on the context information, the computing device can identify relevant software documentation. Illustratively, a computing device can have a print setup dialog box for a word processing program currently open. Based on this context, the computing device can identify and present any documentation associated with the print dialog box to a user.

Examples of these and other embodiments of the invention will now be further described with reference to the drawings.

Figure 1:
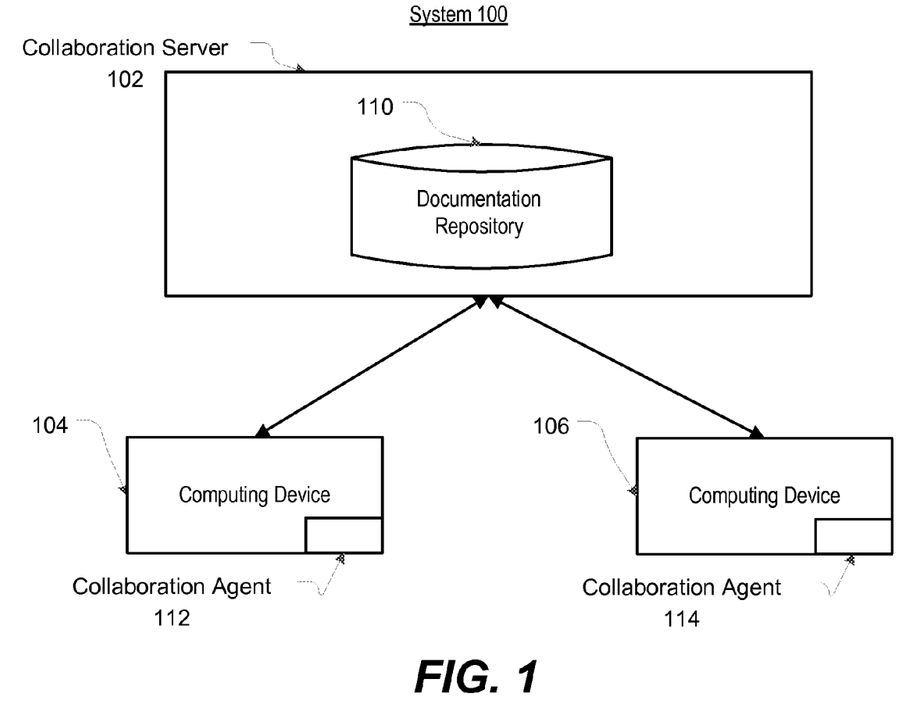
FIG. 1 illustrates a collaboration system according to one embodiment of the present invention.

FIG. 1 illustrates a collaboration system 100 including collaboration server 102, computing device 104 and computing device 106. As shown in FIG. 1, collaboration server 102 can be connected to each of computing devices 104 and 106. Collaboration server 102 can be connected to computing devices 104 and 106 in any suitable manner. For example, collaboration server 102 can be connected to the computing devices via a public network (e.g., the Internet), a local network, an Intranet, and/or the like. While collaboration system 100 only shows one collaboration server and two computing devices, any suitable number of these entities (including zero) can be included. For example, collaboration system 100 can include hundreds or thousands of computing devices.

In the present embodiment, collaboration system 100 may also include software that enables communications between the various entities shown in FIG. 1. For example, communications between the entities may be facilitated by the HTTP, SSL, TLS, TCP/IP, RTP/RTSP protocols, and/or the like.

Collaboration server 102 can be implemented as one or more computer systems. For example, collaboration server 102 can be a large mainframe, a minicomputer cluster, or a group of servers functioning as a unit. In some embodiments, collaboration server 102 can include a computer-readable storage medium and a processor coupled to the medium. In some embodiments, collaboration server 102 can be configured to receive, manage, distribute, and store software documentation. For example, collaboration server 102 can receive and store software documentation from computing device 104. The collaboration system can thereafter dynamically distribute the software documentation to computing device 106 based on context information received from computing device 106.

As shown in FIG. 1, collaboration server 102 can include, among other components, a documentation repository 110.

Documentation repository 110 can be implemented as data stored in one or more electronic storage units (e.g., stand alone hard drives) capable of storing electronic data. In some embodiments, documentation repository 110 can store software documentation and/or other data. For example, documentation repository 110 can store text, web links, screen captures, audio, and video, etc. The software documentation and/or other data can be received from, for example, a computing device of collaboration system 100, a third party entity or service, a software manufacturer, and/or the like. In some embodiments, documentation repository 110 can additionally store context information. For example, a particular item of documentation might be associated with a file open context. As another example, a particular item of documentation might be associated with a human resources department permissions group.

Computing devices 104 and 106 can be any suitable computing device. Computing devices 104 and 106 can be, for example, a computer device, such as a desktop computer, a laptop computer, a tablet device, a mobile phone, a personal digital assistant (PDA), a gaming device, a multimedia device, a handheld device, a multi-function device, a television, a digital video recorder (DVR), and the like. Computing devices 104 and 106 can each include a computer readable memory, and a processor coupled to the memory. Computing devices 104 and 106 can each additionally include standard computer components such as a disk drive, CD ROM drive, display (e.g., CRT or LCD monitor), display adapter, network card, wireless card, input device (e.g., a mouse, a keyboard, a touch screen LCD), and other components, subsystems, and devices.

In some embodiments, the memory of each computing device can store a collaboration agent program (e.g., collaboration agents 112 and 114 respectively). The processors of each of the computing devices can additionally be configured to execute the collaboration agent program.

According to certain embodiments, the collaboration agent program can present a collaboration plane interface to a user via a display of the computing device executing the agent program. A user can interact with the collaboration plane to browse, search, filter, and author documentation content (e.g., text, web links, screen captures, audio, and video) that is tightly associated with a current user experience. In one embodiment, documentation content can be transmitted to and/or received from collaboration server 102. For example, computing device 104 can transmit documentation content authored by its user to collaboration server 102 for storage in document repository 110. As another example, computing device 104 can retrieve documentation content from documentation repository 110.

For simplicity in understanding, the collaboration plane interface will be described with reference to computing device 104. However, it should be appreciated that any suitable computing device, including computing device 106, can present the collaboration plane interface to a user.

In some embodiments, computing device 104, via collaboration agent program 112, can activate or deactivate (e.g., present or hide on a display) the collaboration plane interface in response to a specific hotkey, combination of hotkeys, mouse input, and/or the like received from a user. For example, computing device 104 can monitor for a specific key, such as the keyboard "F1" button. Upon detection of the keyboard input, computing device 104 can activate or present the collaboration plane to the user. In some embodiments, data associated with the collaboration plane interface (e.g., graphical user interface elements, etc.) can be pre-fetched prior to activation of the interface. As a result, when the collaboration plane interface is activated, the interface can be quickly rendered for presentation to a user.

In some embodiments, the collaboration plane interface can include a semi-transparent layer that sits over or overlays a computer user desktop. For example, computing device 104 can present a graphical user interface for an operating system to a user. The graphical user interface can include an image representing a workspace, typically known as a user desktop. The desktop can enable a user to access various software applications, documents, and/or the like. In some embodiments, the desktop can include one or more software elements and/or other display elements, such as software application windows, dialog boxes, taskbars, folders, icons, software application menus, and/or the like.

According to certain embodiments, upon activation of the collaboration plane, a user desktop, including any running software applications and open documents, can be overlaid with a semi-transparent layer. The semi-transparent layer can, for example, modify the brightness (e.g., darken or lighten), the contrast, the color, the sharpness, the clarity, and/or the like of the user desktop. In doing so, it can be indicated to a user that the desktop is in the background and/or inaccessible due to activation of the collaboration plane interface. The collaboration plane interface, by contrast, might include a separate graphical user interface with dialog boxes, search fields, documentation content, etc. that is not affected or modified by the semi-transparent layer.

It will be appreciated that the entities (e.g., collaboration server, computing devices, etc.) shown in FIG. 1 are illustrative and that variations and modifications are possible. For instance, collaboration system 100 might not include a collaboration server. Rather, documentation content might be stored locally on each computing device. Documentation content might be shared or distributed among the different computing devices in such embodiments through a peer-to-peer network, and/or the like. Illustratively, when a new item of documentation content is generated, the computing device on which the content is generated can automatically distribute the content to other computing devices in a collaboration system.

Figure 2:
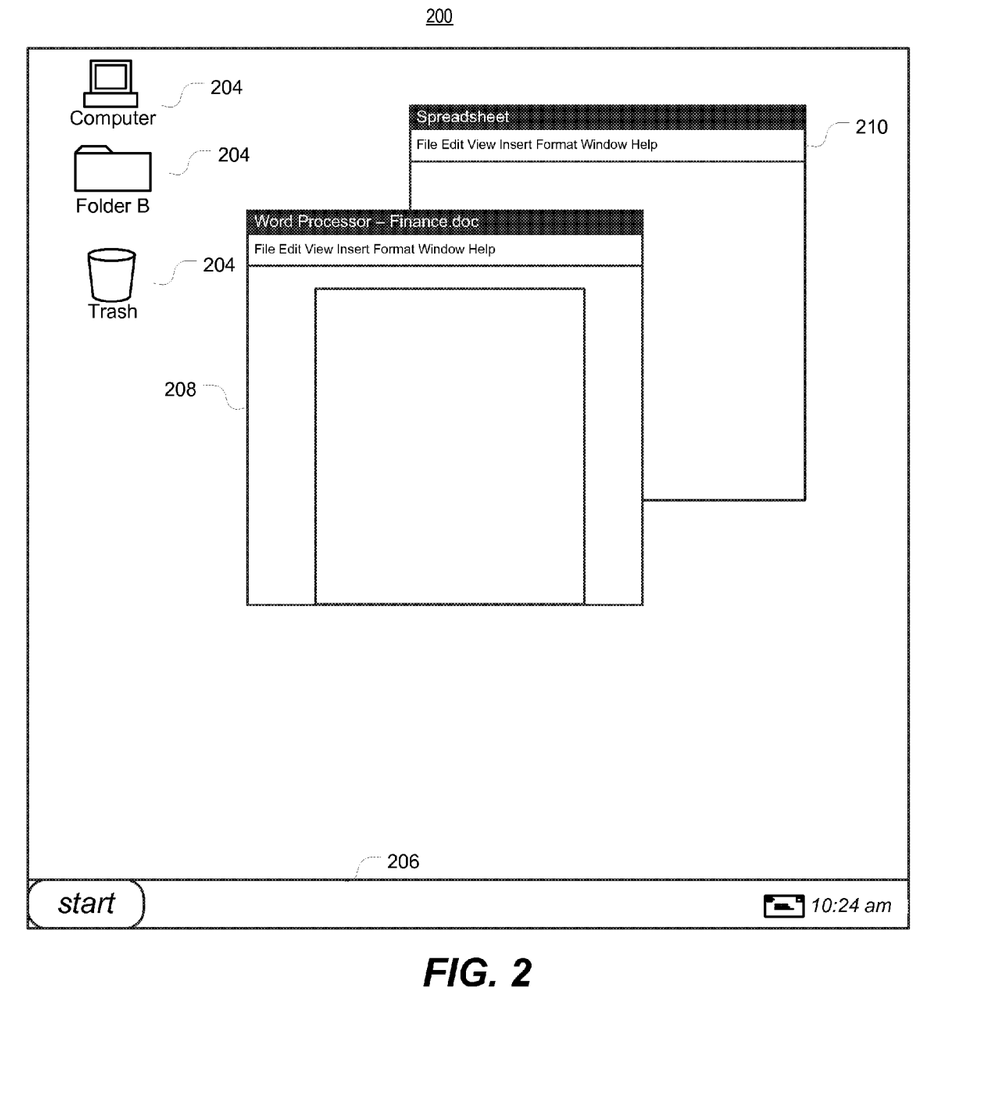
FIG. 2 illustrates an exemplary user desktop prior to the activation of a collaboration plane interface according to one embodiment of the present invention.

FIG. 2 illustrates an exemplary user desktop 200 prior to the activation of a collaboration plane interface. As shown in FIG. 2, the user desktop 200 includes icons 204, a taskbar 206, and other software elements with which a user can interact. FIG. 2 additionally shows two running software applications: a word processor 208 and a spreadsheet application 210. While the collaboration plane interface is deactivated, a user can interact with the user desktop in a conventional manner. For example, a user can use a keyboard connected to the computing device to draft a document within the word processor application.

Figure 3:
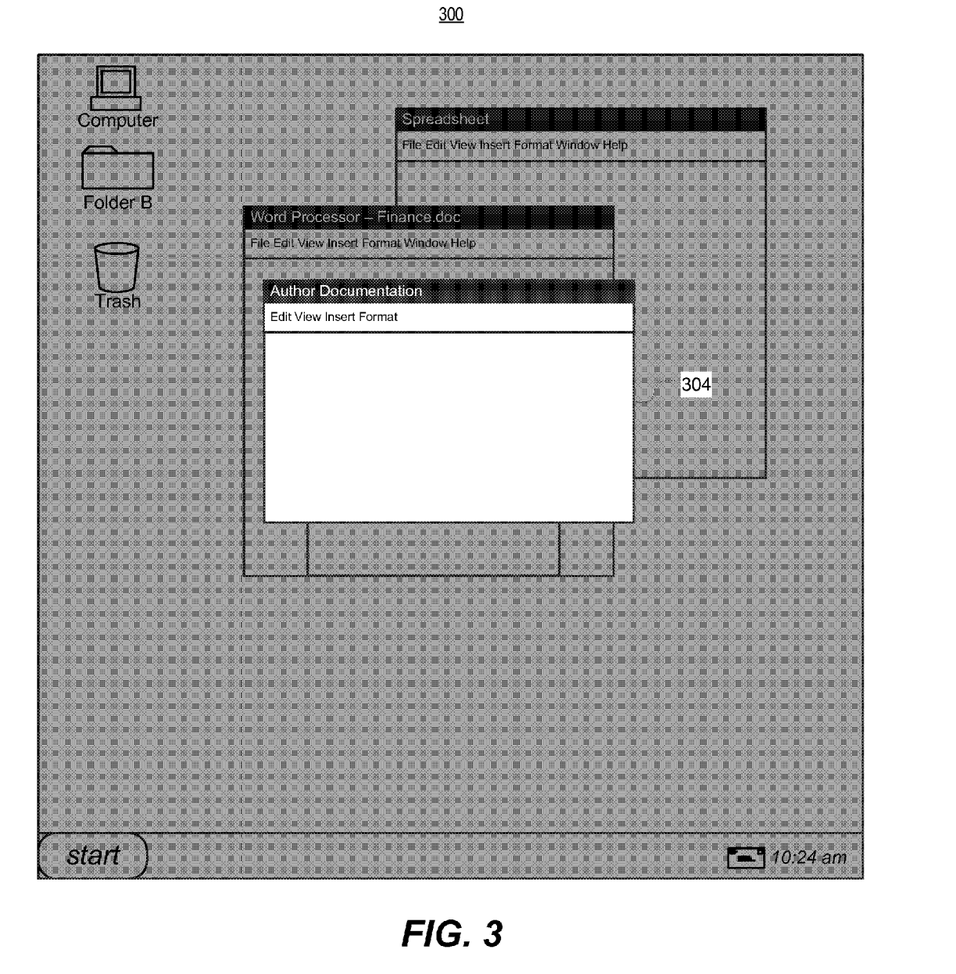
FIG. 3 illustrates an exemplary user desktop following the activation of the collaboration plane interface according to one embodiment of the present invention.

FIG. 3 illustrates an exemplary user desktop 300 following the activation of the collaboration plane interface. As shown in FIG. 3, the brightness of the user desktop can be dimmed. Furthermore, the user might not, in some embodiments, be able to use or access the user desktop. Illustratively, the user might not be able to input text into the word processor application. As further shown in FIG. 3, a graphical user interface 304 for the collaboration plane can be displayed over standard elements of user desktop 300. Graphical user interface 304 can include any suitable dialog boxes, buttons, icons, text fields, and/or other elements that can enable a user to author, manage, and retrieve documentation content. For example, graphical user interface 304 of FIG. 3 includes a dialog box for authoring documentation. As also shown in FIG. 3, the brightness of graphical user interface 304 for the collaboration plane is not dimmed. This can indicate to a user that graphical user interface 304 for the collaboration plane interface can be accessed.

As briefly discussed, the collaboration plane interface can, in some embodiments, enable a user to author documentation content. The documentation content can include any suitable information and elements, such as text annotations, screen captures, audio recording annotations, video recording annotations (e.g., video captured from a web camera), hyperlinks, multimedia files, and/or the like. For example, an individual item of documentation content can include text-based instructions for the steps needed to perform a particular function, a video recording demonstrating the steps, and a hyperlink referencing additional information available on the Internet.

In some embodiments, as part of the authoring process, the collaboration plane interface can enable a user to associate authored documentation content with one or more contexts. A context can be any suitable computing or collaboration context.

A computing context can include, for example, the current software application that has foreground focus or with which a user was most recently interacting on a computer device; the software applications currently being executed by a computing device; the dialog boxes currently in foreground focus or open on a user desktop; a button, icon, or menu item at which a mouse cursor is currently pointed; the files or documents (e.g., word processor documents, spreadsheet documents, presentation software documents, web pages, etc.) currently opened or most recently accessed by a user; a portion of a document (e.g., a particular paragraph, a specific spreadsheet cell, etc.) currently opened or most recently accessed by a user; and/or the like. For example, a user can associate an item of documentation content with a particular file. Thereafter, when the user or another user accesses the collaboration plane interface while the same file is open, the associated documentation content can be presented. As another example, a user can associate an item of documentation content with three different software applications. Thereafter, when the user or another user accesses the collaboration plane interface while each of the three different software applications are being executed on a computing device, the associated documentation content can be presented.

A collaboration context can include, for example, a user list, a department association, a workgroup association, a production status, and/or the like. For example, a user can associate an item of documentation content with a particular user or list of users. Thereafter, only those listed users can access the documentation content via the collaboration plane interface. As another example, a user can associate an item of documentation content with a department (e.g., a finance department, human resources department, etc.). As such, only those users or computing devices associated with the specified department can access the documentation content via the collaboration plane interface.

Figure 4:
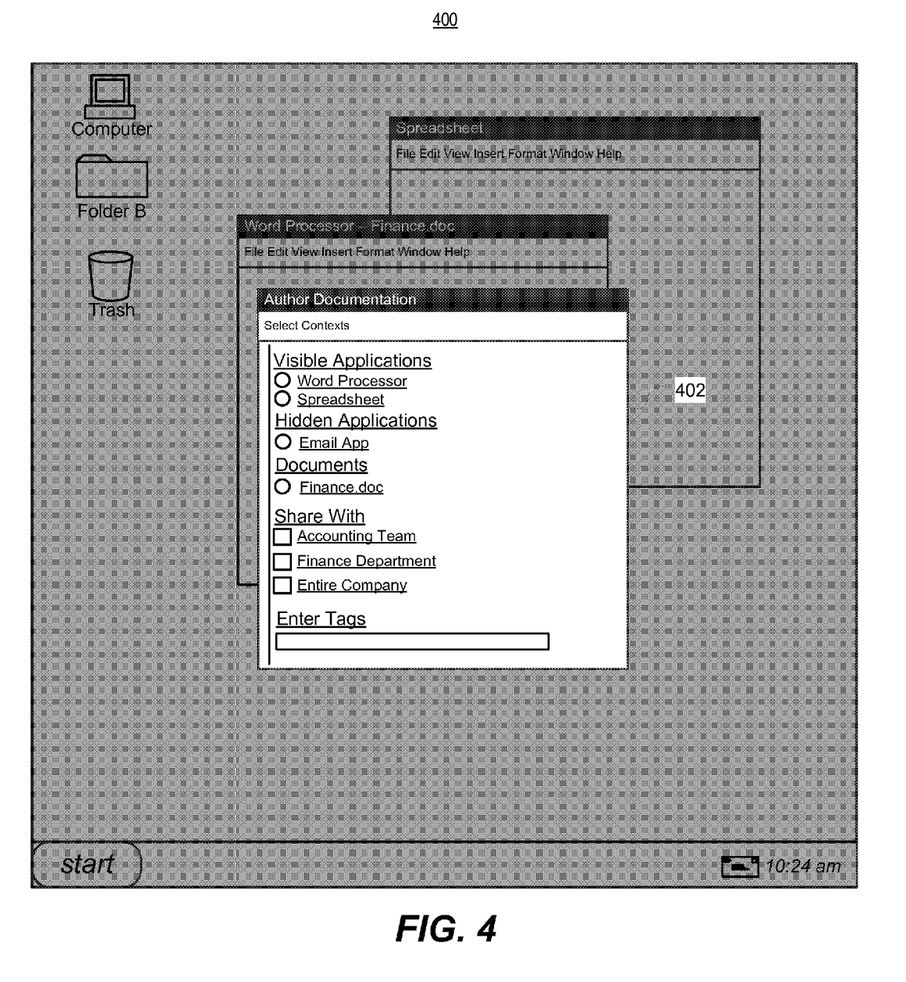
FIG. 4 illustrates an exemplary selection interface for a collaboration plane interface according to one embodiment of the present invention.

FIG. 4 illustrates an exemplary selection interface for a collaboration plane 402 with which a user can interact to indicate the contexts for a particular item of documentation content. As shown in FIG. 4, various contexts can be presented to a user for selection. The contexts presented for selection can be based on any suitable information received and/or collected by computing device 104. For example, computing device 104 can detect that a word processor application and a spreadsheet application are currently running on the computing device. As such, computing device 104 can include the word processor and spreadsheet applications as contexts selectable by the user. As another example, the computing device 104 can detect that the "finance.doc" document is currently open and/or being accessed. As a result, computing device 104 can include the "finance.doc" document as a context selectable by the user. As still another example, the context selection interface can include different collaboration contexts (e.g., the accounting team, finance department, or entire company) for a user to select. The presented collaboration contexts can be based on the group or team with which the authoring user or computing device 104 is associated. As yet another example, the context selection interface can include a text field in which a user can enter textual tags. For example, the user can input the tag "word processing," or "finance." As discussed, a user can select one or more contexts with which a particular item of documentation content can be associated. These contexts can later used to determine if a particular item of documentation content should be presented to a user.

In some embodiments, the authored documentation content, context information, and other data can be securely stored in documentation repository 110 (shown in FIG. 1). For example, computing device 104 can transmit the received data to collaboration server 102 for storage in documentation repository 110. In some embodiments, recently authored documentation content might require approval prior to allowing the documentation content to be shared with other users. Illustratively, an administrator might review newly authored documentation content prior to allowing the documentation content to be shared with other users.

In some embodiments, multiple users can author documentation content associated with the same context. Illustratively, multiple users can author documentation content using different computing devices for a word processing application. As such, documentation content authored by different users can be presented to a user via the collaboration plane interface. In addition, the users can add to, update, modify, and/or delete previously authored documentation content. In some embodiments, a user's ability to change previously authored documentation content can be subject to certain permissions (e.g., only a user that authored an item of documentation content can delete the content), and/or changes may be reviewed by an administrator prior to making them visible to other users.

By allowing multiple users to author and update documentation content, embodiments can enable the documentation content of collaboration system 100 to grow dynamically. In doing so, the ability of the documentation content to be useful can be continually improved.

In some embodiments, a user can use computing device 104 to receive, browse, search, and/or filter for documentation content. In particular, a user can activate the collaboration plane by, for example, inputting a hotkey combination. Thereafter, computing device 104 can automatically or manually retrieve documentation content and present the content to the user.

According to certain embodiments, computing device 104 can retrieve documentation content based on the current contexts of the computing device. For example, computing device 104 can identify a current software application that has foreground focus or with which a user was most recently interacting on the computer device; the software applications currently being executed by the computing device; the dialog boxes currently in foreground focus or open on a user desktop; a button, icon, or menu item at which a mouse cursor is currently pointed; the files or documents (e.g., word processor documents, spreadsheet documents, presentation software documents, web pages, etc.) currently opened or most recently accessed by a user; a portion of a document (e.g., a particular paragraph, a specific spreadsheet cell, etc.) currently opened or most recently accessed by a user, and/or the like.

Computing device 104 can identify such information in any suitable active (e.g., actively querying for context information) and/or passive (e.g., receiving context information without specific queries) manner. For example, computing device 104 can use software application and/or device driver hooks, software application plug-ins, etc. to receive context information. Illustratively, the collaboration agent running on computing device 104 can periodically or continuously receive context information from one or more software applications via software application hooks. As another example, computing device 104 can use queries to operating systems, queries to software applications etc. to receive context information. For example, the collaboration agent running on computing device 104 can periodically or continuously generate operating system calls querying for context information. Illustratively, the collaboration agent can query an operating system running on computing device 104 for window title names, window positioning information, application names, document names, uniform resource locators, and/or the like.

In some embodiments, computing device 104 can additionally identify any user lists, departments, production statuses, and/or the like associated with computing device 104 and/or the user of computing device 104. Based on this information, computing device 104 can identify documentation content associated with the determined contexts for computing device

104. For example, computing device 104 can determine that a word processor application is currently being run on the device. Based on such a determination, computing device 104 can select documentation content associated with a word processor application context. As another example, computing device 104 can determine that a user is associated with an accounting team (e.g., based on user login credentials) and select documentation content associated with that team.

Selected documentation content can be presented in any suitable manner. For example, documentation content can be presented in windows presented on the collaboration plane interface. In some embodiments, the documentation content can be visually associated with one or more software elements in a suitable manner. For example, an item of document content can be positioned close to or on top of a software element (e.g., a window or dialog box on the user desktop overlain by the collaboration plane interface) associated with the context with which the item of document content is also associated. Illustratively, an item of document content might be associated with a word processor context. As such, the item of document content might be positioned close to a dialog box for the word processor. As another example, an arrow can be presented that connects an item of document content with one or more software elements associated with the same context with which the item of document content is associated.

In some embodiments, computing device 104 can retrieve documentation content based on contexts manually input by a user. More specifically, a user can subscribe to or set filters. Filters can include, for example, contexts, keywords, identifiers, content authors, associations, screen locations, and/or the like. For example, a user can specify that he or she would like to filter for documentation content related to a spreadsheet application authored by a certain person or group. As another example, a user can specify that he or she would like to filter for documentation content related to a certain screen location. The same user can also separately specify that he or she would like to filter for documentation content associated with a word processing tag. In response, computing device 104 can present to the user, for example in a first list, documentation content that is authored by the specified person or group regarding the spreadsheet application. The computing device 104 can additionally present to the user, for example in a second list, documentation content that is associated with the word processing tag.

By enabling a user to filter for documentation content, computing device 104 can effectively create unlimited specialized sub-planes for each context. In some embodiments, computing device 104 can continuously or periodically monitor newly added or updated documentation content that meets the criteria of a user's filter. If new or updated documentation content is detected, computing device 104 can provide an alert to the user. Illustratively, an icon on the user desktop (e.g., situated on a task bar of the user desktop) can indicate when new content on a subscribed filter has been detected.

According to certain embodiments, a user can actively search or browse for documentation content. Illustratively, upon activation of the collaboration plane, computing device 104 can provide a graphical user interface for a user to input keywords and/or other parameters. Upon receiving the input, a search can be performed based on the input. More specifically, computing device 104 can access documentation repository 110 of collaboration server 102 in order to perform the search. The search results, which can include documentation content, can be presented to the user. In some embodiments, the search results can be influenced by the determined context of computing device 104.

In some embodiments, a user can transmit questions or other information to another user via the collaboration plane interface. For example, computing device 104 can associate one or more experts with one or more contexts. Illustratively, a first expert can be associated with a word processor context. Another expert can be associated with finance department documents context. When a user searches for documentation, computing device 104 can present the user with a list of expert users based on the current context for the computing device. A user can thereafter pose questions, comments, and/or the like to one or more of the experts, e.g., via email, instant message, voice over IP (VOIP), or the like. Because the experts are associated with the specific context of computing device 104, a user's questions can more likely be answered quickly. As another example, a user can query a region of a display. Other users that have subscribed to filters for that region can receive the query and service the query. For example, the users might provide a specific response or furnish new documentation content.

In some embodiments, computing device 104 can present the collaboration plane interface as an infinite resolution user interface that can be zoomed or panned. In some embodiments, a user can locally set a unique and persistent state for a collaboration plane interface. In doing so, the collaboration plane can include customized views, filters, preferences, etc. for the user.

In certain embodiments, when the collaboration plane is in a panned or global view, similar documentation content can be clustered and scaled to abstract detail. In doing so, the global view can have a clean and simple interface for a user to navigate. In order to be presented with more detailed information for an individual item of documentation content, a user can zoom in on a particular documentation content cluster. For example, 30 items of documentation content can be associated with a specific button (e.g., the print button) of a software application. In a global view, a user can identify that 30 items of documentation content are associated with the button. However, the user cannot read the individual documentation content. In order to view each individual item of content or receive more detailed information, a user would be required to zoom in on, click or hover a mouse cursor over a particular cluster.

In some embodiments, the size of a cluster can be used to imply the age of the item. For example, clusters that are shown as larger in the collaboration plane can indicate that the cluster or documentation content associated with the cluster is newer or more recently added. In some embodiments, each cluster can be positioned close to or overlaid over the context with which it is associated. For example, if a cluster is associated with a print button context, the cluster can be positioned close to, or on top of the print button. In some embodiments, a user can arrange certain clusters to appear in certain areas of the collaboration plane interface. For example, a user can subscribe to a filter associated with a "word processing" tag. The user can further specify that any documentation content associated with the tag be placed at the top right hand corner of the collaboration plane interface.

Figure 5:
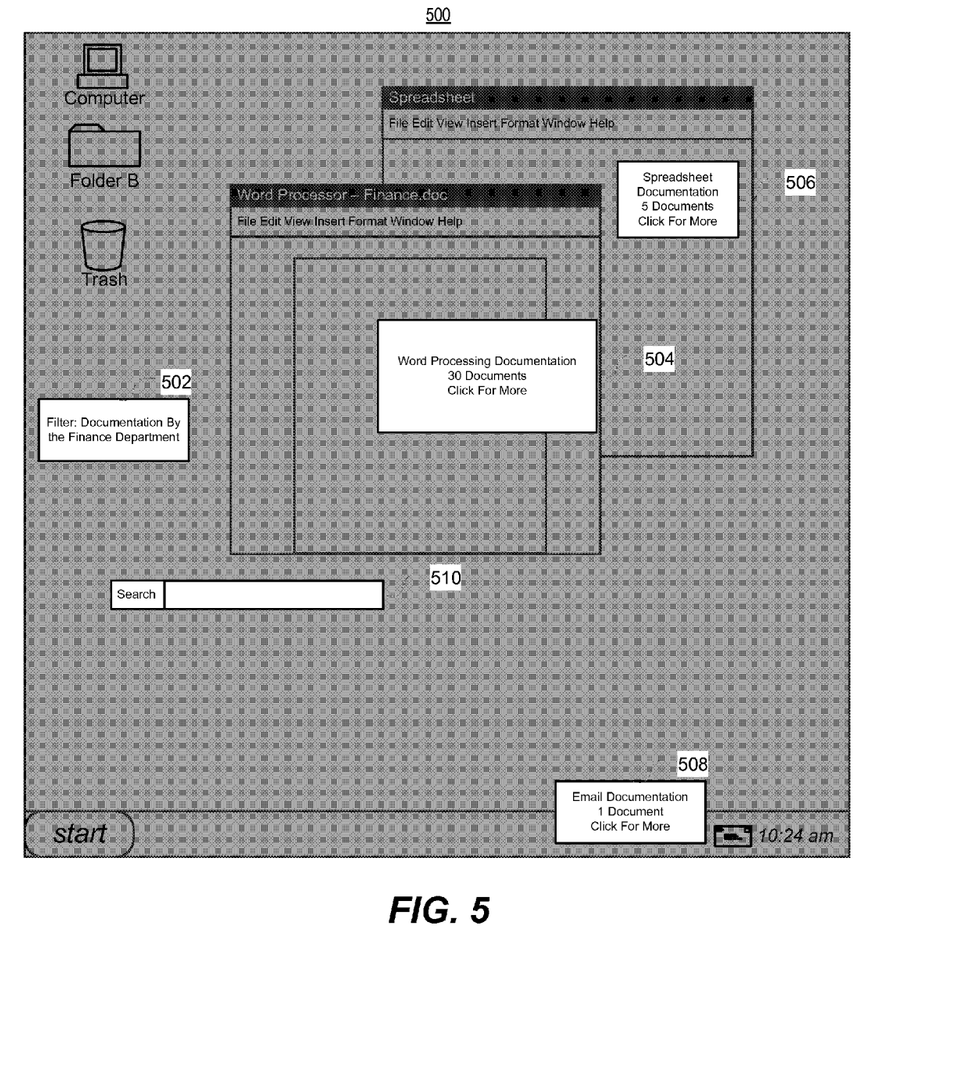
FIG. 5 illustrates an exemplary retrieval interface for a collaboration plane interface according to one embodiment of the present invention.

FIG. 5 illustrates an exemplary retrieval interface 500 for a collaboration plane with which a user can interact to obtain documentation content, implementing some of the above disclosed features. As shown in FIG. 5, retrieval interface 500 can include a number of clusters with which a user can interact to obtain documentation content. More specifically, retrieval interface 500 includes a cluster 504 for word processing documentation, a cluster 506 for spreadsheet documentation, and a cluster 508 for email documentation. Each cluster can appear based on the current context of the computing device. In particular, because the computing device is currently running a word processor application, a spreadsheet application, and has recently received a new email, clusters for those contexts can appear. As discussed, a user can zoom in (e.g., by clicking on the cluster) to view specific items of documentation content e.g., as a list. As shown in FIG. 5, the retrieval interface further includes a search field 510 with which a user can enter a keyword or search term. Retrieval interface 500 can additionally include filters previously set up by a user. Illustratively, FIG. 5 shows that the user has previously set up a filter 502 for documentation authored by the finance department. By zooming in on the filter, a user can obtain documentation that meets the requirements of the filter.

Figure 6:
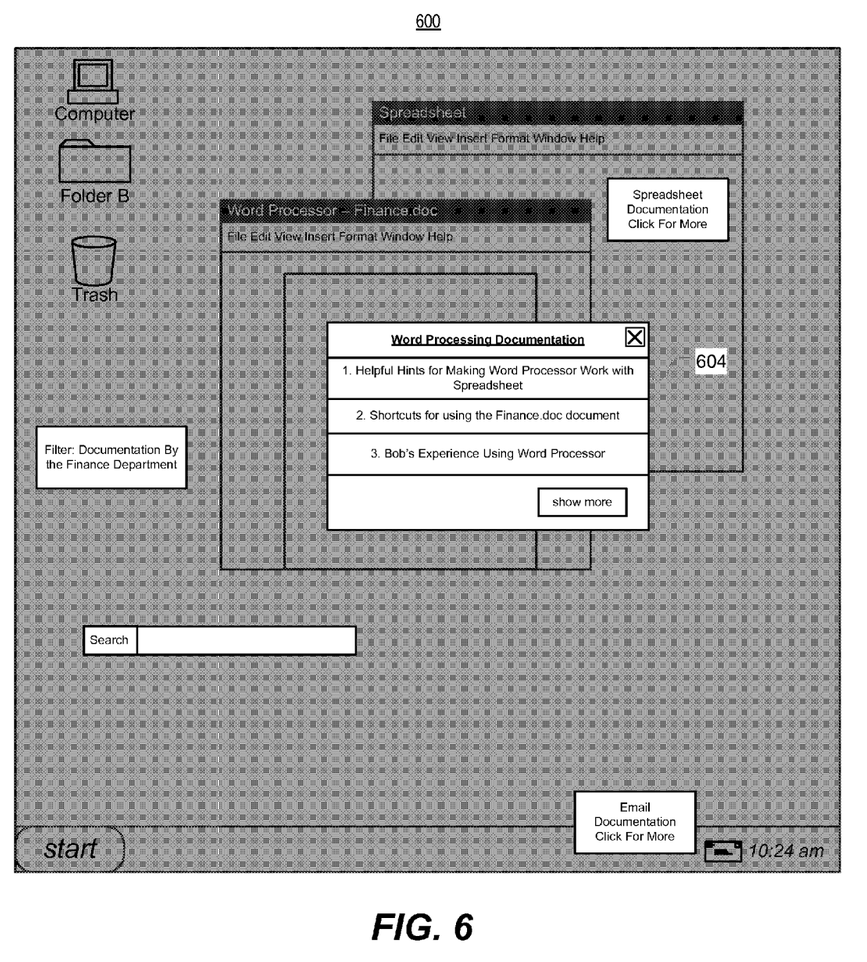
FIG. 6 illustrates an exemplary retrieval interface for a collaboration plane following the selection of a cluster according to one embodiment of the present invention

FIG. 6 illustrates retrieval interface 500 for a collaboration plane after a user has selected a particular cluster, in this case, cluster 504 of FIG. 5. As shown in FIG. 6, the user has selected the word processing documentation cluster. In response, computing device 104 displays, in box 604, a list of documentation content relevant for the identified context of computing device 104. For example, because both the word processor and spreadsheet applications are currently running, the list can include a reference to documentation associated with a context in which both the word processor application and spreadsheet application are running As another example, because Finance.doc is currently open, the list can include a reference to documentation regarding the Finance.doc document. A user can thereafter select an item of documentation from the list to view.

Examples of processes that can be used to author and retrieve documentation content will now be described.

Figure 7:
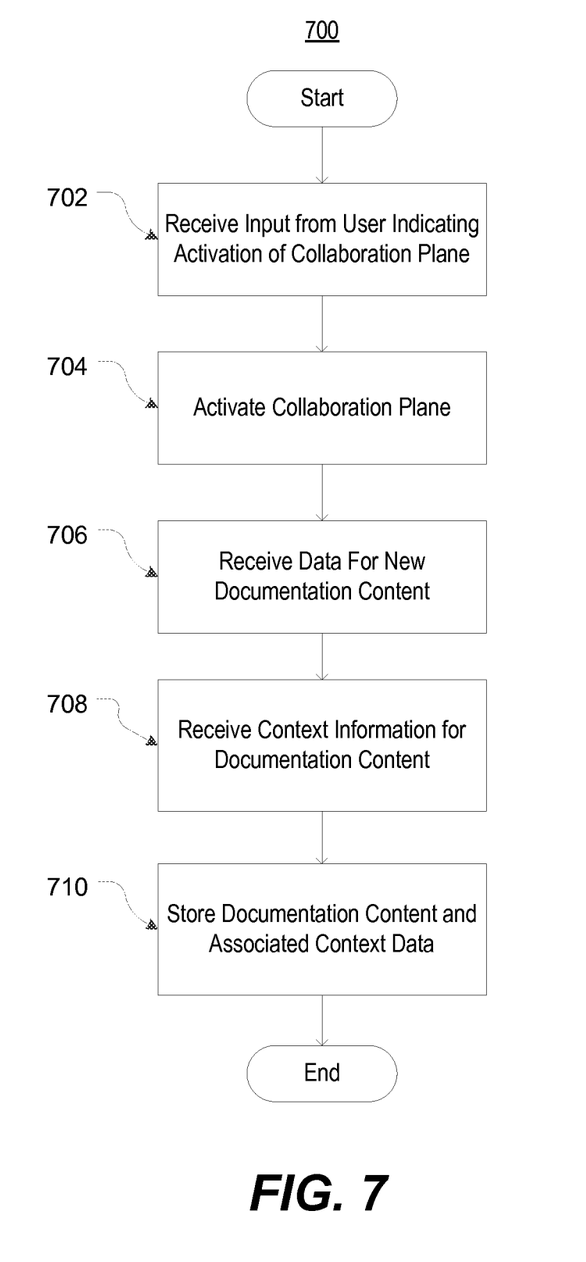
FIG. 7 is a flow diagram of a process for authoring documentation content according to an embodiment of the present invention.

FIG. 7 is a flow diagram of a process 700 for authoring documentation content according to an embodiment of the present invention. Process 700 can be performed by e.g., computing device 104 or computing device 106 of FIG. 1. For simplicity in understanding, process 700 will be described with reference to computing device 104.

At block 702, computing device 104 can receive input from a user indicating activation of a collaboration plane interface. For example, computing device 104 can detect that the user has input a hot key or combination of hot keys. Illustratively, computing device 104 can detect that the user has input the "SHIFT-F2" hot key combination.

At block 704, computing device 104 can, in response to detecting the user indication of block 702, activate the collaboration plane interface. In some embodiments, for example, computing device 104 can overlay a semi-transparent layer over a user desktop. The semi-transparent layer can modify the user desktop in a manner to indicate that the desktop is in the background and/or inaccessible to the user. In certain embodiments, computing device 104 can additionally provide a graphical user interface for the collaboration plane interface. The interface can include, for example, dialog boxes, windows, buttons, and/or the like with which a user can interact in order to retrieve, search, browse, manage, and/or author documentation content.

At block 706, computing device 104 can receive data for new documentation content from the user. In particular, the user of computing device 104 can indicate that he or she wishes to author new documentation content. In response, computing device 104 can present the user with an interface for drafting the new content. For example, the interface can be similar to a conventional word processor and enable a user to input text. The interface can additionally allow a user to attach or generate screen captures, audio, video, hyperlinks, and/or other multimedia elements. In some embodiments, the interface can enable a user to record audio content via a microphone connected to computing device 104. The audio content can thereafter be included as part of the documentation content.

At block 708, computing device 104 can receive context information from the user. In particular, after receiving the documentation content, computing device 104 can present an interface with which a user can select one or more contexts for the documentation content. For example, the interface can include a list of potential contexts based on the determined contexts of computing device 104. For example, if computing device 104 is currently running an email application, computing device 104 can include the email application as a potential context selectable by the user. In some embodiments, computing device 104 can enable a user to select any number of contexts to be associated with the documentation content.

In some embodiments, computing device 104 can identify the contexts of computing device 104 using one or more information sources. For example, collaboration system agent 112 running on computing device 104 can collect and/or receive context information from an operating system, software applications, software application hooks, input devices, sensors, device driver hooks, etc. being executed on the computing device. Illustratively, computing device 104 can receive window title information, window position information, mouse cursor position information, window focus information, and/or the like. Based on such information, computing device 104 can determine its current contexts. For example, the window title information can indicate that a word processing application is currently running on computing device 104. Based on this information, computing device 104 can determine that its current contexts include a word processing application context.

According to some embodiments, documentation content can be associated with any suitable combination of contexts. For example, a user can indicate that a particular item of documentation content is to be associated with a word processing application context or a finance department context. As such, when a computing device of a user searching for documentation is currently running the word processing application, the item of documentation can be presented to the user. Likewise, when a user searching for documentation is associated with the finance department, the item of documentation can be presented to the user. As another example, a user can indicate that a particular item of documentation content is to be associated with both the word processing application context and the finance department context. As a result, the item of documentation might not be presented to a user unless the user's computing device is running the word processing application and the user is associated with the finance department.

At block 710, computing device 104 can store the documentation content and associated context information. For example, computing device 104 can store the content and context information in documentation repository 110. Illustratively, computing device 104 can transmit the received documentation content and context information over a network to collaboration server 102. Collaboration server 102 can, in turn, securely store the documentation content and context information in document repository 110.

Figure 8:
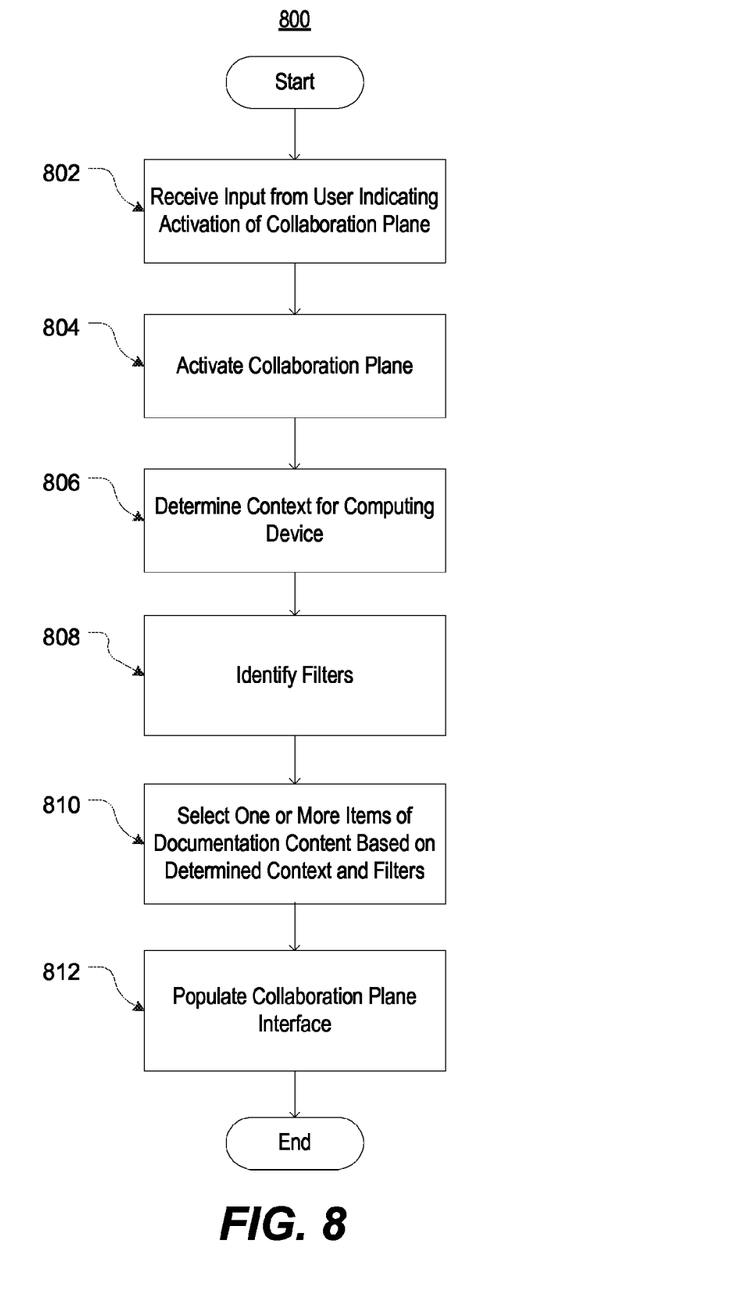
FIG. 8 is a flow diagram of a process for retrieving documentation content according to an embodiment of the present invention.

FIG. 8 is a flow diagram of a process 800 for retrieving documentation content according to an embodiment of the present invention. Process 800 can be performed by e.g., computing device 104 or computing device 106 of FIG. 1. For simplicity in understanding, process 800 will be described with reference to computing device 104.

At block 802, computing device 104 can receive input from a user indicating activation of the collaboration plane interface. For example, computing device 104 can detect that the user has input a hot key or combination of hot keys. Illustratively, computing device 104 can detect that the user has input the "SHIFT-F2" hot key combination.

At block 804, computing device 104 can activate the collaboration plane interface. In some embodiments, for example, computing device 104 can overlay a semi-transparent layer over a user desktop. In some embodiments, the semi-transparent layer can modify the user desktop in a manner to indicate that the desktop is in the background and/or inaccessible to the user. In certain embodiments, computing device 104 can additionally provide a graphical user interface for the collaboration plane. The interface can include, for example, dialog boxes, windows, buttons, and/or the like with which a user can interact in order to retrieve, search, browse, manage, and/or author documentation content.

At block 806, computing device 104 can determine the current context for computing device 104. In some embodiments, computing device 104 can collect and/or gather context information from one or more information sources. For example, the collaboration system agent running on computing device 104 can collect and/or receive context information from an operating system, software applications, software application hooks, device driver hooks, etc. being executed on the computing device. Illustratively, computing device 104 can receive window title information, window position information, mouse cursor position information, window focus information, and/or the like. Based on such information, computing device 104 can determine its current contexts. For example, the window title information can indicate that a word processing application is currently running on computing device 104. Based on this information, computing device 104 can determine that its current context includes a word processing application context.

At block 808, computing device 104 can identify one or more filters associated with the user. In particular, computing device 104 can determine whether the user has previously subscribed to or otherwise established any filters. For example, computing device 104 might determine that its users previously established a filter for a particular author. In some embodiments, information for a user's filter can be stored locally on computing device 104 and/or on collaboration system 102.

At block 810, computing device 104 can select one or more items of documentation content based on the determined context and filters associated with the user. In particular, based on the determined context and filter information, computing device 104 can retrieve documentation content from documentation repository 110. For example, computing device 104 can determine that the device currently is running a word processor and a presentation application. As such, computing device 104 can retrieve those documentation content associated with a word processor context, a presentation application context, and a combined context including both the word processor and presentation application. Illustratively, computing device 104 might retrieve an item of documentation content associated with the word processor context. Computing device 104 might additionally retrieve an item of documentation content associated with the combined context of the word processor and presentation application.

At block 812, computing device 104 can populate the collaboration plane interface. In some embodiments, computing device 104 can group similar documentation content into clusters on the collaboration plane interface. For example, three items of documentation content might be associated with a word processing application context. As a result, computing device 104 might group the documentation content together in the same cluster. In certain embodiments, computing device 104 can also populate the collaboration plane with clusters based on the one or more identifier filters. For example, twenty items of documentation content might meet the criteria of a filter. As a result, computing device 104 might group the documentation content together in the same cluster. In some embodiments, the clusters can be positioned close to or on top of a software element associated with the context with which the item of document content is also associated.

In some embodiments, a user can select a cluster in order to obtain documentation content. Upon receiving a cluster selection, computing device 104 can, in some embodiments, display a list of documentation content within the cluster. The list can be ranked in any suitable manner. For example, the list can be ranked according to the rating or how helpful a particular item of documentation content has been in the past, the closeness of the particular item of documentation content to the context of computing device 104, and/or the like. Illustratively, computing device 104 might currently be running a word processing application and a spreadsheet application. A first item of documentation content may be associated with a word processing application context. A second item of documentation content may be associated with a combined context specifying that both the word processing application and spreadsheet be running on the computing device. Because the second item of documentation content more closely matches the current context of computing device 104, the second item of documentation might be ranked higher or closer to the top of the list than the first item. After being presented with the list, a user can thereafter make a selection from the list, and computing device 104, in response, can present the selected documentation content to the user.

In other embodiments, upon receiving a cluster selection, computing device 104 can present the entirety of the documentation content associated with the cluster. For example, computing device 104 can display the documentation content in successive order. Computing device 104 can present content items, e.g., by title, etc.

It will be appreciated that processes 700 and 800 are illustrative and that variations and modifications are possible. Steps described as sequential may be executed in parallel, order of steps may be varied, and steps may be modified, combined, added or omitted. In some embodiments, a software element (e.g., a dialog box, list, etc.) presenting a content item to a user can include an "edit" button that a user can operate to edit the item.

Figure 9:
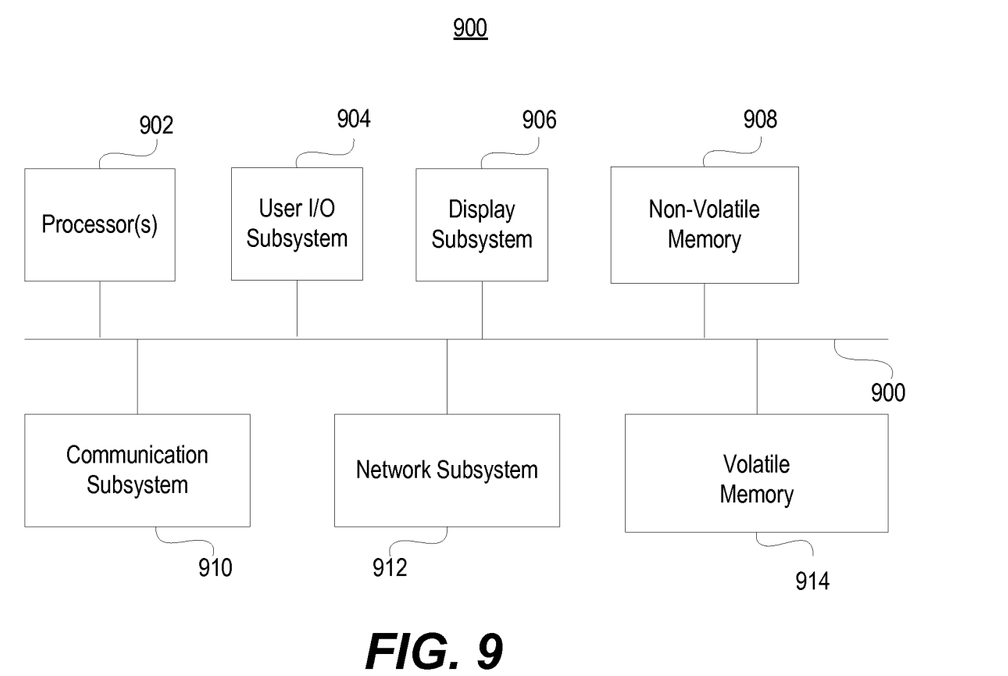
FIG. 9 is a block diagram of exemplary subsystems or components according to one embodiment of the present invention.

An example of a computer system that can be used to implement server 102 and/or computing devices 104, 106 of FIG. 1 is shown in FIG. 9. The subsystems shown in FIG. 9 are interconnected via a system bus 900. Additional subsystems such as a processor 902, user I/O subsystem 904, display subsystem 906, non-volatile memory 908, communication subsystem 910, network subsystem 912, volatile memory 914, and others are shown. Peripherals and input/output (I/O) devices, which couple to user I/O subsystem 904 (which may be a processor or other suitable controller), may be connected to the computer system by any number of means known in the art, such as a USB port. Communication subsystem 910 or network subsystem 912 may be used to connect the computer system to a wide area network such as the Internet, a networked resource, a mouse input device, a scanner device, a printing device, and/or the like. The interconnection via system bus allows processor 902 to communicate with each subsystem and to control the execution of instructions from non-volatile memory 908 or volatile memory 914, as well as the exchange of information between subsystems. Non-volatile memory 908 and/or volatile memory 914 may embody a computer readable medium.

The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

The collaboration plane interface can be used to show documentation created by users and others, e.g., mangers, system administrations, etc. In some embodiments, the collaboration plane interface can also include content provided by a software developer; thus dynamic documentation can be integrated with more traditional, static help files and/or the like. In some embodiments, users may not be allowed to modify the content that is developer-provided, but may be allowed to annotate or comment on it, thereby augmenting developer-provided content with additional tips, suggestions, clarifications, shortcuts, etc.

In some embodiments, editors can periodically review user content, e.g., to correct errors, consolidate duplicative content items, etc. Editing of content produced by other users may be made available as an option for all users or restricted to editorial team, and editorial rights can be controlled on a per-context basis or other basis as desired.

For example, the processes described herein may be implemented using hardware components, software components, and/or any combination thereof The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A method for authoring content using a computing device, the method comprising:
    presenting, by the computing device, a content authoring interface;
    receiving, by the computing device, an item of content via the content authoring interface;
    receiving, by the computing device, at least one context associated with the item of content;
    dynamically updating, by the computing device, a content repository based on the received item of content and the at least one received context associated with the item of content;
    determining, by the computing device, one or more current contexts for the computing device;
    selecting, by the computing device, one or more items of content from the content repository based at least in part on the determined one or more current contexts; and
    presenting, by the computing device, the selected one or more items of content.

2. The method of claim 1, wherein the determining includes determining one or more contexts associated with a user desktop of the computing device.

3. The method of claim 1, wherein the determining is based at least in part on one or more of user desktop window information, user desktop window focus information, user desktop cursor position information, or software application status information.

4. The method of claim 1, wherein the determining includes identifying a workgroup associated with the computing device.

5. The method of claim 1, wherein the determined one or more contexts are based on at least one of the following:
    one or more software applications being executed by the computing device;
    one or more software applications installed on the computing device;
    one or more software elements being executed by the computing device;
    one or more software application files being accessed by the computing device;
    one or more portions of a software application file being accessed by the computing device;
    input device information;
    one or more computing device identifiers;
    one or more user identifiers associated with a user of the computing device; or
    one or more user groups associated with a user of the computing device.

6. The method of claim 1, wherein the presenting includes displaying a graphical user interface, wherein the graphical user interface includes a semi-transparent layer.

7. The method of claim 1, wherein the presenting includes overlaying at least one of the selected items of content over a display element, wherein the display element is associated with a determined context.

8. The method of claim 7, wherein the display element is one of a dialog box, an icon, a software application button, or a software application window.

9. The method of claim 1, wherein the presenting includes rendering a visual element indicative of an association between at least one of the selected items of content and a display element, wherein the display element is associated with a determined context.

10. The method of claim 1, wherein the presenting includes grouping, based on the determined contexts, one or more of the selected items of content; and
    presenting the one or more selected items of content based on the grouping.

11. The method of claim 10, wherein items of content associated with the same context are grouped together.

12. The method of claim 1, further comprising:
    receiving a message from a first user;
    identifying a second user based on the determined contexts; and
    sending the received message to the second user.

13. The method of claim 12, wherein the sending includes transmitting the received message to another computing device, wherein the another computing device is associated with the second user.

14. The method of claim 12, wherein the sending includes transmitting the received message to an electronic message repository associated with the second user.

15. A non-transitory computer-readable storage medium containing program instructions that, when executed by a computer system, cause the computer system to execute a method for authoring documentation, the method comprising:
    determining, by the computer system, one or more current contexts for a computing device;
    presenting, by the computer system, software documentation selected based at least in part on the determined one or more current contexts;
    receiving, by the computer system, updates to the software documentation from a user; and dynamically updating, by the computer system, a content repository with the updates to the software documentation.

16. The non-transitory computer-readable storage medium of claim 15, wherein the determining includes determining one or more contexts associated with a user desktop of the computing device.

17. The non-transitory computer-readable storage medium of claim 15, wherein determining the one or more contexts is based on user desktop window information, user desktop window focus information, user desktop cursor position information, or software application status information.

18. A system comprising:
    an input device configured to receive inputs from a user;
    an output device configured to present information to a user; and
    a processor connected to the input device and the output device, wherein the processor is configured to:
        present a content authoring interface using the output device;
        receive an item of content using the input device;
        receive at least one context associated with the item of content using the input device;
        determine one or more current contexts for the system, wherein the determining includes receiving user desktop window information, user desktop window focus information, user desktop cursor position information, and software application status information associated with a user desktop;
        select one or more items of content based at least in part on the determined current contexts; and
        present the selected one or more items of content using the output device.

19. The system of claim 18, wherein the determining includes identifying whether two or more specific software applications are currently being executed by or installed on the system; and
    the selecting includes selecting at least one item of content associated with the two or more specific software applications if the two or more specific software applications are currently being executed by or installed on the system.

20. The system of claim 18, wherein the determining further includes identifying a workgroup.

* * * * *

UNITED STATES PATENT AND TRADEMARK OFFICE
CERTIFICATE OF CORRECTION

PATENT NO.        : 8,645,845 B2                                           Page 1 of 1
APPLICATION NO.   : 13/219256
DATED             : February 4, 2014
INVENTOR(S)       : Charles Tappan et al.

It is certified that error appears in the above-identified patent and that said Letters Patent is hereby corrected as shown below:

On the Title page, item (12), delete "Tappen" and insert -- Tappan --.

On the Title page, "Inventors" item (75), line 3
        Please remove "Tappen" and insert -- Tappan --.

Signed and Sealed this
Twentieth Day of May, 2014

Michelle K. Lee
*Deputy Director of the United States Patent and Trademark Office*